(12) United States Patent
Campbell et al.

(10) Patent No.: US 9,045,619 B2
(45) Date of Patent: Jun. 2, 2015

(54) LASER-SENSITIVE COATING COMPOSITION

(75) Inventors: Jonathan Campbell, Riehen (CH); Marc Mamak, New City, NY (US); Clifford John Coles, West Lothian (GB)

(73) Assignee: DATALASE LTD., Cheshire (GB)

( * ) Notice: Subject to any disclaimer, the term of this patent is extended or adjusted under 35 U.S.C. 154(b) by 806 days.

(21) Appl. No.: 12/671,547

(22) PCT Filed: Aug. 12, 2008

(86) PCT No.: PCT/EP2008/060550
§ 371 (c)(1),
(2), (4) Date: Nov. 30, 2010

(87) PCT Pub. No.: WO2009/024497
PCT Pub. Date: Feb. 26, 2009

(65) Prior Publication Data
US 2011/0065576 A1    Mar. 17, 2011

(30) Foreign Application Priority Data

Aug. 22, 2007 (EP) .................................. 07114742
Sep. 7, 2007 (EP) .................................. 07115872

(51) Int. Cl.
| | | |
|---|---|---|
| B41M 5/26 | (2006.01) | |
| C08K 3/22 | (2006.01) | |
| C09D 5/26 | (2006.01) | |
| C09D 7/12 | (2006.01) | |

(52) U.S. Cl.
CPC .............. *C08K 3/22* (2013.01); *B41M 5/267* (2013.01); *C08K 2003/2241* (2013.01); *C09D 5/26* (2013.01); *C09D 7/1216* (2013.01)

(58) Field of Classification Search
CPC ....................................................... B41M 5/267
USPC ....................................................... 428/195.1
See application file for complete search history.

(56) References Cited

U.S. PATENT DOCUMENTS

| | | | |
|---|---|---|---|
| 2,286,726 A | 6/1942 | Emerson | |
| 3,161,770 A | 12/1964 | Huett et al. | |
| 3,959,571 A | 5/1976 | Yahagi et al. | |
| 4,157,982 A | 6/1979 | Clemons et al. | |
| 4,446,324 A | 5/1984 | Graser | |
| 4,623,557 A | 11/1986 | Yamori et al. | |
| 4,680,598 A | 7/1987 | Obitsu et al. | |
| 4,820,683 A | 4/1989 | Vervacke et al. | |
| 4,861,620 A | 8/1989 | Azuma et al. | |
| 4,981,675 A | 1/1991 | Haase et al. | |
| 5,028,643 A | 7/1991 | Jaffe | |
| 5,075,195 A | 12/1991 | Bäbler et al. | |
| 5,166,350 A | 11/1992 | Bedekovic et al. | |
| 5,171,624 A | 12/1992 | Walter | |
| 5,329,006 A | 7/1994 | Baumann et al. | |
| 5,354,633 A * | 10/1994 | Lewis et al. ...................... 430/5 |
| 5,380,694 A | 1/1995 | Krebs | |
| 5,413,629 A | 5/1995 | Yasui et al. | |
| 5,446,011 A | 8/1995 | Hayakawa et al. | |
| 5,470,502 A | 11/1995 | Hahn et al. | |
| 5,718,754 A | 2/1998 | Macpherson et al. | |
| 5,721,190 A | 2/1998 | Miyamoto et al. | |
| 5,733,414 A | 3/1998 | Stockwell | |
| 5,879,855 A | 3/1999 | Schädeli et al. | |
| 5,888,283 A | 3/1999 | Mehta et al. | |
| 5,897,938 A | 4/1999 | Shinmoto et al. | |
| 6,022,905 A | 2/2000 | Harris et al. | |
| 6,054,021 A | 4/2000 | Kurrle et al. | |
| 6,174,586 B1 | 1/2001 | Peterson | |
| 6,210,472 B1 | 4/2001 | Kwan et al. | |
| 6,274,065 B1 | 8/2001 | Deno et al. | |
| 6,290,765 B1 | 9/2001 | Jaycock et al. | |
| 6,306,493 B1 | 10/2001 | Brownfield | |
| 6,335,783 B1 | 1/2002 | Kruit | |
| 6,372,394 B1 | 4/2002 | Zientek | |
| 6,372,819 B1 * | 4/2002 | Mizobuchi et al. ........... 523/161 |
| 6,475,695 B2 * | 11/2002 | Kuroki et al. ................ 430/200 |
| 6,596,386 B1 | 7/2003 | Reck et al. | |
| 6,677,273 B2 | 1/2004 | Torii et al. | |
| 6,706,785 B1 | 3/2004 | Fu | |
| 6,906,735 B2 | 6/2005 | Bhatt et al. | |

(Continued)

FOREIGN PATENT DOCUMENTS

| | | |
|---|---|---|
| CN | 1537059 | 10/2004 |
| DE | 2130845 | 1/1972 |

(Continued)

OTHER PUBLICATIONS

English Language Abstract—AN 1999-125126 [11] of JP 11-1065.
English Language Abstract—AN 2005-106456 [12] of JP 2005-22366.
Anklam, E., "A review of the analytical methods to determine the geographical and botanical origin of honey," Food Chemistry vol. 63, No. 4, pp. 549-562, (1998).
Howbert, et al., "Novel Agents Effective against Solid Tumors: The Diarylsulfonylureas. Synthesis, Activities, and Analysis of Quantitative Structure-Activity Relationships," J. Med. Chem., vol. 33, Issue. 9, pp. 2393-2407, (1990).
Kurzer, F., "Sulfonylureas and Sulfonylthioureas," Chem. Rev., vol. 50, Issue. 1, pp. 1-46, (1952).
Ulrich, H., "The Chemistry of Sulfonylisocyanates," Chem. Rev., vol. 65, Issue. 365, pp. 369-376, (1965).
Knepper, T.P., "Synthetic chelating agents and compounds exhibiting complexing properties in the aquatic environment," Trends in Analytical Chemistry, vol. 22, No. 10, pp. 708-724, (2003).

(Continued)

*Primary Examiner* — Mark Ruthkosky
*Assistant Examiner* — Ian Rummel
(74) *Attorney, Agent, or Firm* — Stoel Rives, LLP

(57) ABSTRACT

The present invention provides a laser-sensitive coating composition comprising titanium dioxide in the anatase form or polymeric particles comprising a polymeric matrix comprising one or more water-insoluble polymers and titanium dioxide in the anatase form encapsulated in the polymeric matrix, and a polymeric binder. The present invention also provides a process for the preparation of the compositions, processes for preparing substrates coated with the coating compositions, substrates coated with the compositions, processes for marking the substrates coated with the compositions, and marked substrates obtainable by the latter processes.

10 Claims, No Drawings

(56) References Cited

U.S. PATENT DOCUMENTS

| | | | |
|---|---|---|---|
| 7,144,676 B2 | 12/2006 | Barr et al. | |
| 7,597,961 B2 | 10/2009 | Maruvada et al. | |
| 8,021,820 B2 | 9/2011 | O'Donoghue et al. | |
| 8,101,544 B2 | 1/2012 | O'Donoghue et al. | |
| 8,178,277 B2 | 5/2012 | Campbell et al. | |
| 2001/0006757 A1 | 7/2001 | Fukino et al. | |
| 2002/0155291 A1 | 10/2002 | Daga et al. | |
| 2003/0104938 A1 | 6/2003 | Torii et al. | |
| 2003/0228439 A1 | 12/2003 | Kawakami | |
| 2004/0106163 A1 | 6/2004 | Workman et al. | |
| 2004/0157947 A1 | 8/2004 | Heneghan | |
| 2004/0242414 A1 | 12/2004 | Morita et al. | |
| 2005/0119368 A1 | 6/2005 | Hall-Goulle et al. | |
| 2005/0148467 A1 | 7/2005 | Makitalo et al. | |
| 2005/0186511 A1 | 8/2005 | Khan | |
| 2006/0040217 A1 | 2/2006 | Stubbs | |
| 2006/0072437 A1 | 4/2006 | Shiono et al. | |
| 2006/0094599 A1 | 5/2006 | Kuboyama et al. | |
| 2006/0147842 A1* | 7/2006 | Khan | 430/311 |
| 2006/0154818 A1 | 7/2006 | Destro et al. | |
| 2006/0155007 A1* | 7/2006 | Huber | 523/205 |
| 2007/0082139 A1 | 4/2007 | Dermeik et al. | |
| 2007/0087292 A1 | 4/2007 | Day et al. | |
| 2007/0098900 A1 | 5/2007 | Abe et al. | |
| 2007/0218206 A1 | 9/2007 | Reichert et al. | |
| 2008/0023164 A1 | 1/2008 | Fredlund et al. | |
| 2008/0207444 A1 | 8/2008 | O'Donoghue et al. | |
| 2009/0107645 A1 | 4/2009 | Legnerfalt et al. | |
| 2009/0191420 A1 | 7/2009 | O'Donoghue et al. | |
| 2009/0220749 A1 | 9/2009 | O'Donoghue et al. | |
| 2010/0104825 A1 | 4/2010 | Campbell et al. | |
| 2010/0279079 A1 | 11/2010 | Campbell et al. | |
| 2010/0304166 A1 | 12/2010 | Kaser | |
| 2011/0065576 A1 | 3/2011 | Campbell et al. | |
| 2011/0183126 A1 | 7/2011 | Walker et al. | |
| 2011/0311786 A1 | 12/2011 | Cunningham et al. | |
| 2012/0045624 A1 | 2/2012 | Campbell et al. | |

FOREIGN PATENT DOCUMENTS

| | | |
|---|---|---|
| DE | 1670332 | 3/1972 |
| DE | 4407905 | 9/1995 |
| DE | 19704478 | 8/1998 |
| EP | 0165608 | 12/1985 |
| EP | 0187329 | 7/1986 |
| EP | 0319283 | 6/1989 |
| EP | 0372715 | 6/1990 |
| EP | 0546577 | 6/1993 |
| EP | 0600441 | 6/1994 |
| EP | 0637514 | 2/1995 |
| EP | 0659583 | 6/1995 |
| EP | 0704437 | 4/1996 |
| EP | 0754564 | 1/1997 |
| EP | 0792756 | 9/1997 |
| EP | 0894896 | 2/1999 |
| EP | 0941989 | 9/1999 |
| EP | 0949251 | 10/1999 |
| EP | 1208995 | 5/2002 |
| EP | 1295730 | 3/2003 |
| EP | 1367437 | 12/2003 |
| EP | 1645430 | 4/2006 |
| GB | 1347647 | 2/1974 |
| GB | 1389716 | 4/1975 |
| GB | 2002801 | 2/1979 |
| GB | 1548059 | 7/1979 |
| GB | 2154597 | 9/1985 |
| JP | 61-022988 | 1/1986 |
| JP | 63-172689 | 7/1988 |
| JP | 1232093 | 9/1989 |
| JP | 02-044562 | 2/1990 |
| JP | 02293181 | 12/1990 |
| JP | 7017134 | 1/1995 |
| JP | 08267915 | 10/1996 |
| JP | 9-156228 | 6/1997 |
| JP | 09-254552 | 9/1997 |
| JP | 10282657 | 10/1998 |
| JP | 11-1065 A | 1/1999 |
| JP | 11-115317 | 4/1999 |
| JP | 2000/137320 | 5/2000 |
| JP | 2000/238237 | 9/2000 |
| JP | 2003/206405 | 7/2003 |
| JP | 2003-276334 | 9/2003 |
| JP | 2004/045549 | 2/2004 |
| JP | 2004/160806 | 6/2004 |
| JP | 2005-22366 A | 1/2005 |
| JP | 2005/305872 | 11/2005 |
| JP | 2006/021500 | 1/2006 |
| JP | 2006/291082 | 10/2006 |
| JP | 2009/503170 | 1/2009 |
| WO | WO 97/10307 | 3/1997 |
| WO | WO 00/35679 | 6/2000 |
| WO | WO 02/068205 | 9/2002 |
| WO | WO 02/074548 | 9/2002 |
| WO | WO 02/100914 | 12/2002 |
| WO | WO 2004/043704 | 5/2004 |
| WO | WO 2005/012442 | 2/2005 |
| WO | WO 2005/054576 | 6/2005 |
| WO | WO 2005/068207 | 7/2005 |
| WO | WO 2005/108103 | 11/2005 |
| WO | WO 2006/041401 | 4/2006 |
| WO | WO 2006/052843 | 5/2006 |
| WO | WO 2006/061343 | 6/2006 |
| WO | WO 2006/067073 | 6/2006 |
| WO | WO 2006069653 A1 * | 7/2006 |
| WO | WO 2006/129078 | 12/2006 |
| WO | WO 2006/129086 | 12/2006 |
| WO | 2007/0125578 A1 | 2/2007 |
| WO | WO 2007/012578 | 2/2007 |
| WO | WO 2007/031454 | 3/2007 |
| WO | WO 2007/057367 | 5/2007 |
| WO | WO 2007/088104 | 8/2007 |
| WO | WO 2008/055796 | 5/2008 |
| WO | WO 2010/049281 | 5/2010 |

OTHER PUBLICATIONS

Ninagawa et al., "Formaldehyde Polymers, 26$^a$) : Syntheses and Condensations of Substituted Triphenoxy and Triphenyl Derivatives of 1,3,5-Triazine," Makromol. Chem., vol. 180, pp. 2123-2131, (1979).

"Honey," Wikipedia, http://en.wikipedia.org/wiki/Honey, 16 pgs., (retrieved Sep. 28, 2010).

Preliminary Amendment filed Jun. 20, 2007 in U.S. Appl. No. 11/793,499.

Office Action issued May 12, 2011 in U.S. Appl. No. 11/793,499.

Response to Office Action filed Aug. 8, 2011 in U.S. Appl. No. 11/793,499.

Notice of Allowance issued Sep. 26, 2011 in U.S. Appl. No. 11/793,499.

International Search Report issued May 11, 2006 in International Application No. PCT/EP2005/056763.

Written Opinion of the International Search Authority issued Jun. 26, 2007 in International Application No. PCT/EP2005/056763.

International Preliminary Report on Patentability issued Jun. 26, 2007 in International Application No. PCT/EP2005/056763.

EPO Communication issued Oct. 11, 2013 in EP Patent Application No. EP 2005819361.

Response to EPO Communication filed Apr. 17, 2014 in EP Application No. 2005819361.

Preliminary Amendment filed Jul. 15, 2008 in U.S. Appl. No. 12/087,806.

Office Action issued Dec. 8, 2010 in U.S. Appl. No. 12/087,806.

Response to Office Action filed Apr. 6, 2011 in U.S. Appl. No. 12/087,806.

Notice of Allowance issued Jun. 15, 2011 in U.S. Appl. No. 12/087,806.

International Search Report issued May 7, 2007 in International Application No. PCT/EP2007/050421.

Written Opinion of the International Search Authority issued Jul. 31, 2008 in International Application No. PCT/EP2007/050421.

(56) References Cited

OTHER PUBLICATIONS

International Preliminary Report on Patentability issued Aug. 5, 2008 in International Application No. PCT/EP2007/050421.
EPO Communication issued Sep. 3, 2010 in European Patent Application No. EP 2007712043.
Response to EPO Communication filed Dec. 20, 2010 in European Patent Application No. EP 2007712043.
EPO Communication issued Dec. 1, 2011 in European Patent Application No. EP 2007712043.
Response to EPO Communication filed Jul. 18, 2012 in European Patent Application No. EP 2007712043.
Preliminary Amendment filed Jun. 16, 2009 in U.S. Appl. No. 12/519,423.
Office Action issued Jun. 24, 2011 in U.S. Appl. No. 12/519,423.
Response to Office Action filed Oct. 20, 2011 in U.S. Appl. No. 12/519,423.
Office Action issued Nov. 21, 2011 in U.S. Appl. No. 12/519,423.
Response to Office Action filed Dec. 20, 2011 in U.S. Appl. No. 12/519,423.
Notice of Allowance issued Jan. 17, 2012 in U.S. Appl. No. 12/519,423.
Response to Office Action filed Apr. 6, 2012 in U.S. Appl. No. 12/519,423.
Office Action issued Apr. 9, 2012 in U.S. Appl. No. 12/519,423.
International Search Report issued Feb. 27, 2008 in International Application No. PCT/EP2007/064408.
International Preliminary Report on Patentability issued Jul. 14, 2009 in International Application No. PCT/EP2007/064408.
Written Opinion issued Jul. 9, 2009 in International Application No. PCT/EP2007/064408.
EPO Communication issued Nov. 17, 2009 in EP Patent Application No. 2007858026.
Response to EPO Communication filed Mar. 3, 2010 in EP Patent Application No. 2007858026.
EPO Communication issued Mar. 24, 2010 in EP Patent Application No. 2007858026.
Response to EPO Communication filed Sep. 28, 2010 in EP Patent Application No. 2007858026.
EPO Communication issued Aug. 18, 2011 in EP Patent Application No. 2007858026.
Response to EPO Communication filed Sep. 8, 2011 in EP Patent Application No. 2007858026.
EPO Communication issued Feb. 14, 2012 in EP Patent Application No. 2007858026.
Response to EPO Communication filed Mar. 1, 2012 in EP Patent Application No. 2007858026.
EPO Communication issued Apr. 3, 2012 in EP Patent Application No. 2007858026.
Response to EPO Communication filed May 4, 2012 in EP Patent Application No. 2007858026.
EPO Communication issued Oct. 10, 2013 in EP Patent Application No. 2007858026.
Response to EPO Communication filed Apr. 15, 2014 in EP Patent Application No. 2007858026.
Preliminary Amendment filed Aug. 24, 2009 in U.S. Appl. No. 12/528,352.
Office Action issued Dec. 14, 2011 in U.S. Appl. No. 12/528,352.
International Search Report issued May 20, 2008 in International Application No. PCT/EP2008/052332.
International Preliminary Report on Patentability issued Sep. 8, 2009 in International Application No. PCT/EP2008/052332.
Written Opinion issued Sep. 8, 2009 in International Application No. PCT/EP2008/052332.
EPO Communication issued Dec. 23, 2009 in EP Application No. 2008717151.
Response to EPO Communication filed Jun. 30, 2010 in EP Application No. 2008717151.
EPO Communication issued Jul. 27, 2010 in EP Application No. 2008717151.
Response to EPO Communication filed Nov. 26, 2010 in EP Application No. 2008717151.
EPO Communication issued Dec. 23, 2010 in EP Application No. 2008717151.
Response to EPO Communication filed Apr. 8, 2011 in EP Application No. 2008717151.
EPO Communication issued May 10, 2011 in EP Application No. 2008717151.
Preliminary Amendment filed Sep. 3, 2009 in U.S. Appl. No. 12/529,718.
Office Action issued May 10, 2013 in U.S. Appl. No. 12/529,718.
Response to Office Action filed Aug. 29, 2013 in U.S. Appl. No. 12/529,718.
Office Action issued Dec. 23, 2013 in U.S. Appl. No. 12/529,718.
Response to Office Action filed May 23, 2014 in U.S. Appl. No. 12/529,718.
Notice of Allowance issued Jun. 24, 2014 in U.S. Appl. No. 12/529,718.
International Search Report issued Aug. 5, 2008 in International Application No. PCT/EP2008/052637.
International Preliminary Report on Patentability issued Sep. 15, 2009 in International Application No. PCT/EP2008/052637.
Written Opinion issued Sep. 15, 2009 in International Application No. PCT/EP2008/052637.
EPO Communication issued Dec. 17, 2009 in EP Application No. 2008717393.
Response to EPO Communication filed Jun. 16, 2010 in EP Application No. 2008717393.
International Search Report issued Oct. 21, 2008 in International Application No. PCT/EP2008/060550.
International Preliminary Report on Patentability issued Feb. 24, 2010 in International Application No. PCT/EP2008/060550.
Written Opinion issued Feb. 22, 2010 in International Application No. PCT/EP2008/060550.
EPO Communication issued Jul. 15, 2010 in EP Application No. 2008787124.
Response to EPO Communication filed Nov. 17, 2010 in EP Application No. 2008787124.
Preliminary Amendment filed Apr. 13, 2010 in U.S. Appl. No. 12/682,792.
Office Action issued Aug. 10, 2012 in U.S. Appl. No. 12/682,792.
Response to Office Action filed Dec. 10, 2012 in U.S. Appl. No. 12/682,792.
Office Action issued Feb. 6, 2013 in U.S. Appl. No. 12/682,792.
Response to Office Action filed Jul. 8, 2013 in U.S. Appl. No. 12/682,792.
Office Action issued Jul. 29, 2013 in U.S. Appl. No. 12/682,792.
Response to Office Action filed Oct. 29, 2013 in U.S. Appl. No. 12/682,792.
Office Action issued Dec. 18, 2013 in U.S. Appl. No. 12/682,792.
Response to Office Action filed Jun. 18, 2014 in U.S. Appl. No. 12/682,792.
International Search Report issued Feb. 12, 2009 in International Application No. PCT/EP2008/064166.
International Preliminary Report on Patentability issued May 11, 2010 in International Application No. PCT/EP2008/064166.
Written Opinion issued May 7, 2010 in International Application No. PCT/EP2008/064166.
EPO Communication issued Apr. 5, 2013 in EP Application No. 2008848155.
Response to EPO Communication issued May 20, 2014 in EP Application No. 2008848155.
Preliminary Amendment filed Apr. 11, 2011 in U.S. Appl. No. 13/123,607.
Office Action issued Jun. 17, 2013 in U.S. Appl. No. 13/123,607.
Response to Office Action filed Sep. 17, 2013 in U.S. Appl. No. 13/123,607.
Office Action issued Oct. 1, 2013 in U.S. Appl. No. 13/123,607.
Response to Office Action filed Mar. 31, 2014 in U.S. Appl. No. 13/123,607.
Notice of Allowance issued Apr. 9, 2014 in U.S. Appl. No. 13/123,607.

(56) References Cited

OTHER PUBLICATIONS

Notice of Allowance issued Jul. 7, 2014 in U.S. Appl. No. 13/123,607.
International Search Report issued Dec. 3, 2009 in International Application No. PCT/EP2009/063520.
International Preliminary Report on Patentability issued May 3, 2011 in International Application No. PCT/EP2009/063520.
Written Opinion issued Apr. 27, 2011 in International Application No. PCT/EP2009/063520.
EPO Communication issued Jul. 4, 2011 in European Application No. 09737404.
Response to the EPO Communication filed Jul. 19, 2011 in European Application No. 09737404.
Office Action issued Aug. 9, 2010 in U.S. Appl. No. 11/978,764.
Response to Office Action filed Nov. 9, 2010 in U.S. Appl. No. 11/978,764.
Office Action issued Dec. 16, 2010 in U.S. Appl. No. 11/978,764.
Office Action issued Feb. 1, 2011 in U.S. Appl. No. 11/978,764.
Response to Office Action filed May 2, 2011 in U.S. Appl. No. 11/978,764.
Office Action issued May 12, 2011 in U.S. Appl. No. 11/978,764.

* cited by examiner

LASER-SENSITIVE COATING COMPOSITION

The present invention refers to a laser-sensitive coating compositions, to a process for the preparation of these compositions, to processes for preparing substrates coated with these coating compositions, to substrates coated with these compositions, to processes for marking the substrates coated with these compositions, and to marked substrates obtainable by the latter processes.

Substrates produced on production lines, for example paper, paperboard or plastics, are usually marked with information such as logos, bar codes or batch numbers. Traditionally, the marking of these substrates has been achieved by various printing techniques for example ink-jet or thermal transfer printing. However, these printing techniques are more and more replaced by laser marking as laser marking is cheaper in terms of overall economics and shows performance benefits such as high speed and contact free marking, marking of substrates with uneven surfaces and creation of marks that are so small that they are invisible or nearly invisible to the human eye. Also consumable substrates such as tablets or pills have recently been marked using laser irradiation.

The substrates to be marked by laser irradiation are either laser-sensitive themselves or are coated with a laser-sensitive composition.

For example, U.S. Pat. No. 5,560,769 describes water-based ceramic inks for marking metal surfaces upon laser irradiation. The inks comprise a phosphate and an inorganic colorant, for example titanium dioxide.

U.S. Pat. No. 6,429,889 describes consumable articles such as tablets and pills containing a layer comprising titanium dioxide, preferably in the rutile form, which layer can be marked when exposed to laser irradiation.

The disadvantage of the titanium dioxide layer of U.S. Pat. No. 6,429,889 is that the marking is preferably created by ultraviolet laser irradiation and that infrared laser irradiation is said to physically destroy the substrate.

However, infrared lasers have lower purchasing and maintenance costs than ultraviolet lasers and are also much more convenient in terms of safety requirements.

Thus, it is an object of the present invention to provide coating compositions that yield stable markings of high precision and high contrast upon exposure to infrared laser irradiation.

The composition of the present invention comprises titanium dioxide in the anatase form and a polymeric binder.

Titanium dioxide in the anatase form (also called octahedrite), a tetragonal mineral of dipyramidal habit, occurs in nature. The titanium dioxide in the anatase form can have a particle size in the range of 0.001 to 1000 µm (1 nm to 1 mm). Preferably, the particle size is in the range of 0.01 to 10 µm, more preferably, it is in the range of 0.01 to 1 µm, most preferably it is in the range of 0.01 to 0.5 µm.

Examples of polymeric binders are acrylic polymers, styrene polymers, hydrogenated products of styrene polymers, vinyl polymers, vinyl polymer derivatives, polyolefins, hydrogenated polyolefins, epoxidized polyolefins, aldehyde polymers, aldehyde polymer derivatives, ketone polymers, epoxide polymers, polyamides, polyesters, polyurethanes, polyisocyanates, sulfone-based polymers, silicium-based polymers, natural polymers and natural polymer derivatives.

Acrylic polymers can be polymers formed from a monomer mixture comprising at least one acrylic monomer and optionally other ethylenically unsaturated monomer such as a styrene monomer, vinyl monomer, olefin monomer or α, β-unsaturated carboxylic acid monomer by polymerization of the respective monomers.

Examples of acrylic monomers are (meth)acrylic acid, (meth)acrylamide, (meth)acrylonitrile, ethyl (meth)acrylate, butyl (meth)acrylate, hexyl (meth)acrylate, 2-ethylhexyl (meth)acrylate, glycidyl methacrylate, acetoacetoxyethyl methacrylate, dimethylaminoethyl acrylate and diethylaminoethyl acrylate. Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of α, β-unsaturated carboxylic acid monomers are maleic acid, itaconic acid, crotonic acid, maleic anhydride and maleimide.

Examples of acrylic polymers are poly(methyl methacrylate) and poly(butyl methacrylate), polyacrylic acid, styrene/2-ethylhexyl acrylate copolymer, styrene/acrylic acid copolymer.

Styrene polymers can be polymers formed from a monomer mixture comprising at least one styrene monomer and optionally at least one vinyl monomer, olefin monomer and/or α, β-unsaturated carboxylic acid monomer by polymerization of the respective monomers. Examples of styrene polymers are polystyrene (PS), styrene butadiene styrene block polymers, styrene ethylene butadiene block polymers, styrene ethylene propylene styrene block polymers and styrene-maleic anhydride copolymers. So-called "hydrocarbon resins" are usually also styrene polymers.

Vinyl polymers can be polymers formed from a monomer mixture comprising at least one vinyl monomer and optionally at least one olefin monomer and/or α, β-unsaturated carboxylic acid monomer by polymerization of the respective monomers. Examples of vinyl polymers are polyvinyl chloride (PVC), polyvinyl pyrrolidone, polyvinylidenfluoride, polyvinylalcohol, polyvinylacetate, partially hydrolysed polyvinyl acetate and methyl vinyl ether-maleic anhydride copolymers. Examples of vinyl polymer derivatives are carboxy-modified polyvinyl alcohol, acetoacetyl-modified polyvinyl alcohol, diacetone-modified polyvinyl alcohol and silicon-modified polyvinyl alcohol.

Polyolefins can be polymers formed from a monomer mixture comprising at least one olefin monomer and optionally at least one α, β-unsaturated carboxylic acid monomer by polymerization of the respective monomers. Examples of polyolefines are low-density polyethylene (LDPE), high-density polyethylene (HDPE), polypropylene (PP), biaxially orientated polypropylene (BOPP), polybutadiene, perfluoroethylene (Teflon) and isopropylene-maleic anhydride copolymer Aldehyde polymers can be polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of a polyalcohol is polyvinyl alcohol. Examples of amine monomers are aniline and melamine. Examples of urea monomers are urea, thiourea and dicyandiamide. Examples of aldehyde polymers are polyvinyl butyral formed from butyral and polyvinyl alcohol, melamine-formaldehyde polymer and urea-formaldehyde polymer. Aldehyde polymers formed from phenol and an aldehyde are called phenol resins. Examples of aldehyde polymer derivatives are alkylated aldehyde polymers.

An example of a ketone polymer is ketone resin, a condensation product of methyl cyclohexanone and/or cyclohexanone.

Epoxide polymers can be polymers formed from at least one epoxide monomer and at least one alcohol monomer and/or amine monomer. Examples of epoxide monomers are epichlorohydrine and glycidol. Examples of alcohol monomers are phenol, cresol, resorcinol, xylenol, bisphenol A and glycol. An example of epoxide polymer is phenoxy resin, which is formed from epichlorihydrin and bisphenol A.

Polyamides can be polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalene-dicarboxylic acid. Examples of polyamides are polyhexamethylene adipamide and polycaprolactam.

Polyesters can be formed from at least one monomer having a hydroxy as well as a carboxy group, anhydride group or lactone group or from at least one monomer having two hydroxy groups and at least one monomer having two carboxy groups, anhydride groups or a lactone group. An example of a monomer having a hydroxy as well as a carboxy group is adipic acid. An example of a diol is ethylene glycol. An example of a monomer having a lactone group is carprolactone. Examples of dicarboxylic acids are terephthalic acid, isophthalic acid and 1,4-naphthalenedicarboxylic acid. An example of a polyester is polyethylene terephthalate (PET). Polyesters formed from an alcohol and an acid or acid anhydride are called "alkyd resins".

Polyurethane can be polymers formed from at least one diisocyanate monomer and at least one polyol monomer and/or polyamine monomer. Examples of diisocyanate monomers are hexamethylene diisocyanate, toluene diisiocyanate, isophorone diisocyanate and diphenylmethane diisocyanate.

Examples of sulfone-based polymers are polyarylsulfone, polyethersulfone, polyphenyl-sulfone and polysulfone. An example of a polysulfone is a polymer formed from 4,4-dichloro-diphenyl sulfone and bisphenol A.

Examples of silicum-based polymers are polysilicates, silicone resin and polysiloxanes.

Examples of natural polymers are starch, cellulose, gelatine, casein, rosin, terpene resin, shellac, copal Manila, asphalts, gum Arabic and natural rubber. Examples of natural polymer derivatives are dextrin, oxidised starch, starch-vinyl acetate graft copolymers, hydroxyethyl cellulose, hydroxypropyl cellulose, nirocellulose, methyl cellulose, ethyl cellulose, carboxymethyl cellulose, acetyl cellulose, acetyl propionyl cellulose, acetyl butyryl cellulose, propionyl cellulose, butyryl cellulose and chlorinated rubber.

Many polymeric binders are commercially available or can be prepared by polymerisation techniques known in the art.

Preferably the polymeric binder is an acrylic polymer, a styrene polymer such as "hydrocarbon resin", polystyrene and styrene/maleic acid copolymer, a vinyl polymer such as polyvinyl acetate and polyvinyl alcohol, an aldehyde polymer such as phenol resin and polyvinyl butyral, an aldehyde polymer derivative such as alkylated urea formaldehyde resin and alkylated melamine formaldehyde resin, a ketone resin, an epoxide polymer, a polyamide, a polyimide, a polyester such as an "alkyd resin", a polyurethane, a poly-isocyanate, a silicum-based polymer such as silicone resin, a natural polymer such as rosin, terpene resin, shellac, copal Manila, asphalts, starch and gum Arabic, a natural polymer derivative such as dextrin, nitrocellulose, ethylcellulose, acetyl cellulose, acetyl propionyl cellulose, acetyl butyryl cellulose, propionyl cellulose, butyryl cellulose and carboxymethyl cellulose.

More preferably, the polymeric binder is an acrylic, a styrene polymer, a vinyl polymer or a mixture thereof.

Most preferably, the polymeric binder is a vinyl polymer, a derivative thereof or a mixture of polymeric binders comprising a vinyl polymer or derivative thereof. For example, the polymeric binder is a copolymer of vinyl acetate and an α,β-unsaturated carboxylic acid monomer such as a copolymer of vinyl acetate and crotonic acid.

The composition of the present invention can also comprise a solvent. The solvent can be water, an organic solvent or mixtures thereof.

Examples of organic solvents are $C_{1-6}$-alkyl ester of fumaric or acetic acid, $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, N-methylpyrolidone and sulfolane, whereby $C_{1-4}$-alkanols and $C_{2-4}$-polyols may be substituted with $C_{1-4}$-alkoxy. Examples of $C_{1-6}$-alkyl esters of fumaric acid or acetic acid are ethyl fumarate, ethyl acetate, propyl acetate and butyl acetate. Examples of $C_{1-4}$-alkanols are methanol, ethanol, propanol, isopropanol, butanol, isobutanol, sec-butanol and tert-butanol. Examples of a $C_{1-4}$-alkoxyderivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile.

Preferably, the organic solvent is selected from the group consisting of $C_{1-6}$-alkyl ester of fumaric or acetic acid, $C_{1-4}$-alkanols, $C_{2-4}$-polyols, $C_{3-6}$-ketones, dimethylformamide and dimethylacetamide, whereby $C_{1-4}$-alkanols and $C_{2-4}$-polyols may be substituted with $C_{1-4}$-alkoxy.

More preferably, the organic solvent is a $C_{1-6}$-alkyl ester of acetic acid. Most preferably, it is propyl acetate.

The composition of the present invention can also comprise additional components.

The additional components that may be included in the composition can be any component suitable for improving the performance of the composition. Examples of additional components are infrared absorbers, catalysts, pigments, stabilizers, antioxidants, rheology modifiers, wetting agents, biocides, smoke suppressants, char forming compounds and taggants. Taggants are various substances added to a product to indicate its source of manufacture.

IR absorbers can be organic or inorganic. Examples of organic IR absorbers are alkylated triphenyl phosphorothionates, for example as sold under the trade name Ciba® Irgalube® 211 or Carbon Black, for example as sold under the trade names Ciba® Microsol® Black 2B or Ciba® Microsol® Black C-E2. Examples of inorganic IR absorbers are oxides, hydroxides, sulfides, sulfates and phosphates of metals such as copper, bismuth, iron, nickel, tin, zinc, manganese, zirconium, tungsten, lanthanum, and antimony, including antimony(V) oxide doped mica and tin(IV) oxide doped mica.

Especially the addition of specific IR absorbers, like lanthanum hexaboride powder (<10 micron, supplied by Sigma Aldrich) or preferably tungsten suboxide, tungsten bronze or mixtures comprising tungsten trioxide, tungsten bronze and metallic tungsten, has an excellent effect on the laser sensitivity.

Hence, the invention relates especially to a composition which comprises, besides titanium dioxide in the anatase form and a polymeric binder, tungsten suboxide, tungsten bronze, or mixtures of tungsten trioxide, tungsten bronze and metallic tungsten.

Tungsten suboxide powders, (e.g. $WO_{2.7}$) are commercially available as fine powders (5-20 microns) e.g. from Osram Sylvania.

Tungsten suboxides and tungstates are known as infrared shielding material. The publications EP 1 676 890 and US2007/0187653 (Sumitomo Metal Mining Company) disclose an infrared shielding nanoparticle dispersion comprising tungsten trioxide having reduced oxygen.

Preferred compositions, especially for uncoloured, white or transparent systems, are novel mixtures comprising tungsten suboxides or tungsten bronze, because due to its surprisingly high efficiency of conversion of IR radiation into heat, this tungsten oxide material can be applied at such a low concentration that its own colour is acceptable for most applications. The same is true for transparency: the material (plastics, coatings) comprising this tungsten oxide material remains also highly transparent.

Thus, the invention relates also to compositions comprising titanium dioxide in the anatase form, a polymeric binder, and a tungsten oxide of the formula $WO_{3-x}$ wherein W is tungsten, O is oxygen, "3−x" means "3 minus x", and x is 0.1-1, i.e. "3−x" is a value from 2.0 to 2.9, and/or a tungstate of the formula $M_qW_yO_z$, wherein M is one or more group or element selected from ammonium, H, Li, Na, K, Rb, Cs, Ca, Ba, Sr, Fe, Sn, Mo, Ni, Pd, Pt, Cu, Ag, Au, Zn, Cd, Al, Ga, In and Tl; W is tungsten, O is oxygen, $0.001 \leq q/y \leq 1$, and $2.0 < z/y \leq 3.0$. Preferably y is 1. Tungstates of the formula $M_qW_yO_z$, are also called tungsten bronze. Examples are: $Na_{0.33}WO_3$, $K_{0.33}WO_3$, $Cs_{0.33}WO_3$, $Ba_{0.33}WO_3$, $Rb_{0.33}WO_3$. Particularly preferred are tungstates of the formula $M_qW_yO_x$, wherein M represents hydrogen. A particularly preferred novel example is $H_{0.53}WO_3$. Examples for mixed oxides are: $Na_{0.8}M_{0.05}W_{0.95}O_3$ or $Rb_{03}M_{0.5}W_{0.5}O_3$.

Preferred is the use of $W_yO_z$, especially preferred $WO_{2.7}$.

$WO_{2.7}$ is commercially available or may be prepared by reducing ammonium tungstate in a plasma reactor. The commercially available $WO_{2.7}$ may be dispersed and then this dispersion is milled in a mill, e.g. a Dynomill mill with 0.4-micrometer zirconium balls to obtain particles having a particle size between 10 nm and 1 μm, preferably between 10 nm and 500 nm, more preferably between 10 and 200 nm.

Even more preferred are novel mixtures comprising tungsten trioxide ($WO_3$), a hydrogen comprising tungstate (e.g. $WO_3H_{0.53}$) and (metallic) tungsten. Said novel mixtures may be prepared by reducing ammonium paratungstate [$(NH_4)_{10}W_{12}H_{2O}O_{42}.4H_2O$, sold by Osram Sylvania] in a plasma reactor at 5000-10000 K (Kelvin) with hydrogen. The thus obtained mixtures contain about 25-55% by weight of $WO_3H_{0.53}$, 35-60% of $WO_3$, and 3-35% of tungsten, it being understood that the sum of these three components is 100%, e.g. 35% of $WO_3H_{0.53}$, 56% of $WO_3$, and 9% of tungsten.

The amount of tungsten oxide, tungstate, or of the above novel mixtures which are added to the ink is between 0.01 and 2.0% by weight, especially 0.05 to 0.15%, preferably 0.1% by weight. In this amount the slight blue color of tungsten oxide and the black color imparted by tungsten is not relevant.

The invention relates also to compositions comprising titanium dioxide in the anatase form, a polymeric binder, and the above novel mixtures.

The catalyst can be any catalyst that increases the sensitivity of the composition for laser marking so that markings can be obtained at higher speeds or lower energies. For example, if the marking is a result of a laser-induced reduction process, reducing agents can be added as catalysts.

Pigments can be added as inorganic IR absorbers, for enhanced contrast between unimaged and imaged areas or as a security feature.

Examples of pigments which function as inorganic IR absorbers are kaolin, calcined kaolin, mica, aluminum oxide, aluminum hydroxide, aluminum silicates, talc, amorphous silica and colloidal silicon dioxide.

Examples of pigments which can be added for enhanced contrast between umimaged and imaged area are titanium dioxide in the rutile form, zinc sulphide, calcium carbonate, barium sulfate, polystyrene resin, urea-formaldehyde resin, hollow plastic pigment.

Examples of pigments which can be added as a security feature are fluorescent pigments or magnetic pigments.

Examples of rheology modifiers are xanthan gum, methylcellulose, hydroxypropyl methyl-cellulose, or acrylic polymers such as those sold under the tradenames Ciba® Rheovis® 112, Ciba® Rheovis® 132 and Ciba® Rheovis® 152.

An example of a wetting agent is Ciba® Irgaclear® D, a sorbitol based clarifying agent.

Examples of biocides are Acticide® MBS, which includes a mixture of chloromethyl isothiazolinone and methyl isothiazolinone, Biocheck® 410, which includes a combination of 2-dibromo-2,4-dicyanobutane and 1,2-benzisothiazolin-3-one, Biochek®721M, which includes a mixture of 1,2-dibromo-2,4-dicyanobutane and 2-bromo-2-nitro-1,3-propandiol and Metasol®TK 100, which includes 2-(4-thiazolyl)-benzimidazole.

An example of a smoke suppressant is ammonium octamolybdate.

Examples of char forming compounds are carbohydrates such as monosaccharides, disaccharides and polysaccharides, and derivatives thereof wherein the carbonyl group has been reduced to a hydroxyl group, so-called sugar alcohols. A particular preferred char forming compound is saccharose.

The composition of the present invention is preferably a coating or printing composition.

The composition of the present invention can comprise from 1 to 90%, preferably from 10 to 80%, more preferably, from 20 to 70%, most preferably from 30 to 60% by weight of titanium dioxide in the anatase form based on the weight of the total composition.

The composition of the present invention can comprise from 1 to 90%, preferably from 10 to 80%, more preferably, from 20 to 70%, most preferably from 30 to 60% by dry weight of the binder based on the weight of the total composition.

The composition of the present invention can comprise from 0 to 70%, preferably from 1 to 50%, more preferably, from 5 to 30%, most preferably from 5 to 20% by weight of the solvent based on the weight of the total composition.

The composition of the present invention can comprise from 0 to 10%, preferably from 0 to 5% by weight of the additional components based on the weight of the total composition.

Also part of the present invention is a process for preparing the composition of the present invention, which process comprises the step of mixing the titanium dioxide in anatase form and the binder, optionally in the presence of a solvent.

Also part of the invention are polymeric particles comprising a polymeric matrix comprising one or more water-insoluble polymers and titanium dioxide in the anatase form encapsulated in the polymeric matrix.

A polymer is water-insoluble if less than 5 g polymer dissolve in 100 g neutral (pH=7) water.

The polymeric particles can have a particle size in the range of 0.001 to 1000 μm (1 nm to 1 mm). Preferably, the particle size is in the range of 0.01 to 500 μm, more preferably, it is in the range of 1 to 100 μm, most preferably it is in the range of 10 to 20 μm.

The water-insoluble polymers can be selected from the group consisting of acrylic polymers, styrene polymers, hydrogenated products of styrene polymers, vinyl polymers, vinyl polymer derivatives, polyolefins, hydrogenated polyolefins, epoxidized polyolefins, aldehyde polymers, aldehyde polymer derivatives, ketone polymers, epoxide polymers, polyamides, polyesters, polyurethanes, polyisocyanates, sulfone-based polymers, silicium-based polymers, natural polymers and natural polymer derivatives.

Definitions of the listed polymers are given above.

If the polymeric matrix comprises two polymers, the polymers can form a core shell polymer, wherein one polymer is the shell and the other the core.

The polymers listed above can be uncrosslinked or crosslinked.

It is preferred, that the polymer matrix comprises at least one crosslinked polymer.

Preferably, the polymeric matrix comprises one or more polymers selected from the group consisting of acrylic polymers, styrene polymers such as polystyrene, vinyl polymers such as polyvinyl pyrrolidone and polyvinyl alcohol, aldehyde polymers such as urea-formaldehyde resin and melamine formaldehyde resin, epoxide polymers, polyamides, polyurethanes, silicum-base polymers such as polysilicates, silicone resins and polysiloxanes, natural polymers such as gelatine and natural polymer derivatives such as cellulose derivatives, for example ethyl cellulose.

More preferably, the polymeric matrix comprises one or more polymers selected from the group consisting of acrylic polymers and aldehyde polymers.

More preferably, the polymeric matrix comprises i) styrene/acrylic acid copolymer and styrene/methyl methacrylate, ii) crosslinked polyacrylamide or iii) melamine-formaldehyde polymer and sodium acrylate/acrylamide copolymer, and iv) crosslinked styrene/acrylic acid copolymer and styrene/methyl methacrylate copolymer. Most preferably, the polymeric matrix comprises styrene/acrylic acid copolymer and styrene/methyl methacrylate.

The polymeric particles of the present invention can also comprise additional components.

The additional component can be IR absorbers, UV absorbers, pigments, smoke suppressants and taggants. Taggants are various substances added to a product to indicate its source of manufacture.

The polymeric particles can comprise from 10 to 90 by weight of the titanium dioxide in anatase form, from 10 to 90% by weight of the polymeric matrix and from 0 to 10% by weight of additional components based on the dry weight of the polymeric particles.

Preferably, the polymeric particles comprise from 20 to 80 by weight of the titanium dioxide in the anatase form, from 20 to 80% by weight of the polymeric matrix and from 0 to 10% by weight of additional components based on the dry weight of the polymeric particles.

More preferably, the polymeric particles comprise from 30 to 70 by weight of the titanium dioxide in the anatase form, from 30 to 70% by weight of the polymeric matrix and from 0 to 10% by weight of additional components based on the dry weight of the polymeric particles.

Most preferably, the polymeric particles comprise from 40 to 60 by weight of the titanium dioxide in the anatase form, from 40 to 60% by weight of the polymeric matrix and from 0 to 10% by weight of additional components based on the dry weight of the polymeric particles.

Also part of the present invention is a process for the preparation of the polymeric particles of the present invention which process comprises the steps of i) mixing the titanium dioxide in the anatase form with a water-soluble monomer mixture, prepolymer or polymer, optionally in the presence of one or more water-insoluble polymers, and ii) forming a water-insoluble polymer from the water-soluble monomer mixture, prepolymer or polymer and thus effecting encapsulation of the titanium dioxide in the anatase form in a polymeric matrix.

A polymer is water-soluble if 5 g or more than 5 g of polymer dissolve in 100 g neutral (pH=7) water.

A polymer is water-insoluble if less than 5 g of polymer dissolve in 100 g neutral (pH=7) water.

In a first embodiment of the process for the preparation of the polymeric particles, titanium dioxide in the anatase form is mixed with a water-soluble monomer mixture, optionally in the presence of one or more water-insoluble polymers, and the water-insoluble polymer is formed from the water-soluble monomer mixture by polymerization of the monomer mixture in the presence of an initiator.

Preferably, the monomer mixture comprises ethylenically unsaturated monomers such as acrylic monomers, styrene monomers, vinyl monomer, olefin monomers or α, β-unsaturated carboxylic acid monomers. More preferably, the monomer mixture comprises at least one acrylic monomer. A particularly preferred ethylenically unsaturated monomer is acrylamide.

Polymerisation of the monomer mixture can be achieved by addition of a suitable initiator. The initiator can be, for example, a peroxide, a persulfate, an azo compound, a redox couple or mixtures thereof. Examples of peroxides are hydrogen peroxide, tert-butyl peroxide, cumene hydroperoxide and benzoyl peroxide. Examples of persulfates are ammonium, sodium or potassium persulfate. Examples of azo compounds are 2,2-azobisisobutyronitrile and 4,4'-azobis(4-cyanovaleric acid). Examples of redox couples are tert-butylhydrogenperoxide/sodium sulfite, sodium persulfate/sodium hydrogensulfite or sodium chlorate/sodium hydrogensulfite.

The monomer mixture preferably comprises a crosslinking agent carrying two ethylenically unsaturated groups, for example N,N'-methylenebisacrylamide. The monomer mixture can comprise from 0.001 to 20%, preferably from 0.1 to 10%, by weight of a crosslinking agent based on the weight of the monomer mixture.

The one or more water-insoluble polymers, which could optionally be present, could be any-water-soluble polymer.

In a second embodiment of the process for the preparation of the polymeric particles, the titanium dioxide in the anatase form is mixed with a water-soluble prepolymer, optionally in the presence of one or more water-insoluble polymers, and the water-insoluble polymer is formed from the water-soluble prepolymer by crosslinking the prepolymer.

The prepolymer can be any prepolymer capable of forming a water-insoluble polymer, for example a water-soluble aldehyde polymer such as a water-soluble melamine-formaldehyde polymer or a water-soluble urea-formaldehyde polymer. Crosslinking and the formation of water-insoluble melamine-formaldehyde or urea-formaldehyde polymers can be affected by heat and/or acid treatment.

The prepolymer can be prepared by polymerisation of suitable monomers using polymerisation techniques known in the art.

The one or more water-insoluble polymers, which could optionally be present, could be any-water-soluble polymer, preferably it is an acrylic polymer, for example a sodium acrylate/acrylamide copolymer.

In a third embodiment of the process for the preparation of the polymeric particles, the titanium dioxide in the form is mixed with a water-soluble polymer carrying acidic or basic functional groups in their salt forms, optionally in the presence of one or more water-insoluble polymers, and the water-insoluble polymer is formed from the water-soluble polymer by altering the pH.

An example of an acidic functional group in its salt form is the $-COO^-NH_4^+$ group. An example of a basic functional group in its salt form is the $-NH_4^+HCOO^-$ group. An example of a water-soluble polymer carrying acidic functional groups is styrene/acrylic acid ammonium salt copolymer, for example 65/35 (w/w) styrene/acrylic acid, ammonium salt copolymer.

The pH could be altered by addition of acid or base, or alternatively by removal of acid or base, for example when the acidic or basic functional group in their salt forms carry volatile (for example having a boiling point at atmospheric pressure of below 130° C.) counterions, for example $NH_4^+$ or $HCOO^-$, the respective base ($NH_3$) or acid ($HCOOH$) could be removed by distillation.

The water-soluble polymer carrying acidic or basic functional groups in their salt forms can be prepared by polymerisation of suitable monomers using polymerisation techniques known in the art.

The one or more water-insoluble polymers, which could optionally be present, could be any-water-soluble polymer, preferably it is an acrylic polymer, more preferably, it is a styrene/methyl methacrylate copolymer, for example a 70/30 (w/w) styrene/methyl methacrylate copolymer.

In a fourth and preferred embodiment of the process for the preparation of the polymeric particles, the titanium dioxide in the anatase form is mixed with a water-soluble polymer carrying functional groups capable of crosslinking with a crosslinking agent, optionally in the presence of one or more water-insoluble polymers, and the water-insoluble polymer is formed from the water-soluble polymer carrying the functional groups by addition of a crosslinking agent.

Examples of functional groups are carboxy ($-COOH$), hydroxyl ($-OH$), amino ($-NH_2$) and chloro ($-Cl$). Examples of polymers carrying functional groups are polyacrylic acid, styrene/acrylic acid copolymer, polyvinyl chloride (PVC) and polyvinylalcohol.

Examples of crosslinking agents capable of reacting with functional groups are silane derivatives such as vinylsilane, carbodiimide derivatives such as N,N'-dicyclohexyl-carbodiimide (DCC) and 1-ethyl-3-(3-dimethylaminopropyl) carbodiimide hydrochloride (EDC), aziridine derivatives, epoxide derivatives or multivalent metal salts such as zinc oxide or ammonium zirconium carbonate.

Preferred functional groups are carboxy ($-COOH$) groups or salts thereof, such as 65/35 (w/w) styrene-acrylic acid, ammonium salt copolymer. Preferred crosslinkers capable of reacting with carboxy groups are multivalent metal salts such as zinc oxide or ammonium zirconium carbonate.

The water-soluble polymer carrying functional groups can be prepared by polymerisation of suitable monomers using polymerisation techniques known in the art.

The one or more water-insoluble polymers, which could optionally be present, could be any-water-soluble polymer, preferably it is an acrylic polymer, more preferably, it is a styrene/methyl methacrylate copolymer, for example a 70/30 (w/w) styrene/methyl methacrylate copolymer.

The titanium dioxide in the anatase form is preferably mixed with the water-soluble monomer mixture, prepolymer or polymer, optionally in the presence of one or more water-insoluble polymers and/or one or more additional components, in the presence of an aqueous phase, an oil phase and optionally an amphiphatic stabilizer.

The aqueous phase is usually water. The oil phase can be any oil phase, capable of forming a two phase system with water, for example mineral oil, dearomatized hydrocarbon mixture, for example as sold under the tradename Exxon® D40, vegetable oil and aromatic hydro-carbons such as toluene.

The weight ratio of aqueous phase/oil phase is usually from 10/1 to 1/10, preferably from 5/1 to 1/5, more preferably from 1/1 to 1/4.

Usually the aqueous phase and the oil phase are mixed under high shear to form a water-in-oil emulsion comprising the aqueous phase in the form of droplets having an average size from 1 to 20 μm dispersed in the oil phase.

Examples of additional components are given above.

Any suitable amphiphatic stabilizer can be used, for example 90/10 (w/w) stearyl meth-acrylate/methacrylic acid copolymer having a molecular weight of 40,000 g/mol.

After formation of the water-insoluble polymer from the water-soluble monomer mixture, prepolymer or polymer, the polymeric particles can be removed by filtration. Preferably, the aqueous phase and optionally also part of the oil phase is removed before the filtration.

Also part of the present invention is a composition comprising the polymeric particles of the present invention and a polymeric binder.

It is preferred that the polymeric binder is different from the one or more water-insoluble polymers of the polymeric matrix.

Examples of polymeric binders are given above.

The composition of the present invention can also comprise a solvent. Examples of solvents are given above.

The composition of the present invention can also comprise additional components. The additional component can be IR absorbers, UV absorbers, pigments, stabilizers, antioxidants, rheology modifiers, wetting agents, biocides, smoke suppressants and taggants.

The composition can comprise from 1 to 90% by weight of the polymeric particles, from 1 to 90% by dry weight of the polymeric binder, from 1 to 90% by weight of the solvent and from 0 to 10% by weight of additional components based on the weight of the composition.

Preferably, the composition comprises from 20 to 90% by weight of the polymeric particles, from 1 to 60% by dry weight of the polymeric binder, from 10 to 70% by weight of the solvent and from 0 to 10% by weight of additional components based on the weight of the composition.

More preferably, the composition comprises from 30 to 80% by weight of the polymeric particles, from 1 to 40% by dry weight of the polymeric binder, from 15 to 60% by weight of the solvent and from 0 to 10% by weight of additional components based on the weight of the composition.

Most preferably, the composition comprises from 35 to 70 by weight of the polymeric particles, from 5 to 20% by dry weight of the polymeric binder, from 25 to 50% by weight of the solvent and from 0 to 10% by weight of additional components based on the weight of the composition.

Also part of the invention is a process for preparing the composition of the present invention which process comprises the step of mixing the polymeric particles of the present invention and a polymeric binder, optionally in the presence of solvent and additional components.

Also part of the present invention is a process for forming a laser-sensitive coating layer on a substrate, which process comprises the steps of i) applying the compositions of the present invention to the substrate and ii) forming a laser-sensitive coating layer.

The substrate can be a sheet or a three dimensional object, it can be transparent or opaque and it can have an even or uneven surface. An example of a substrate having an uneven surface is a filled paper bag, such as a paper bag of cement. The substrate can be paper, cardboard, metal, wood, textiles, glass, ceramic or a polymer or mixtures thereof. The substrate can also be a pharmaceutical tablet or foodstuff. Examples of polymers are polyethylene terephthalate, low density-polyethylene, polypropylene, orientated polypropylene, biaxially orientated polypropylene, polyether sulfone, polyvinyl chloride polyester and polystyrene. Preferably, the substrate is paper, cardboard or a polymer.

The compositions of the present invention can be applied to the substrate by using a standard coating application as such as a bar coater application, rotation application, spray application, curtain application, dip application, air application, knife application, blade application or roll application. The compositions can also be applied to the substrate by various printing methods such as silk screen printing, gravure printing, offset printing and flexo printing. If the substrate is paper, the compositions can also be applied in the size press or in the wet-end section of the paper machine.

After being applied, the compositions can be dried, for example at ambient or elevated temperature.

The thickness of the obtained coating layer is usually chosen to be in the range of 0.1 to 1000 µm. Preferably, it is in the range of 1 to 500 µm. More preferably, it is in the range of 1 to 200 µm. Most preferably, it is in the range of 1-20 µm.

Also part of the present invention is a substrate having a laser-sensitive coating layer obtainable by above process.

Another part of the invention is a process for forming a protective coating layer on the substrate coated with the composition of the present invention, which process comprises the step of applying a protective coating composition to the substrate having the laser-sensitive coating layer in order to form a protective coating layer on top of the laser-sensitive coating layer.

Any suitable protective coating composition can be used. Ideally, the protective coating composition is a coating composition that yields a protective coating layer which does not absorb at the wavelength of the marking laser so that the laser-sensitive coating layer can be imaged through the protective coating layer without damaging or marking the protective coating layer. Also the protective coating layer is ideally chosen that it does not result in colouration of the laser-sensitive coating layer before the laser irradiation.

Usually the protective coating composition comprises a binder and a solvent.

The binder of the protective coating composition can be any of the binders listed above. Preferably, the binder is a polyurethane polymer.

The solvent can be any of the solvents listed above. Preferably, it is a mixture of water and an organic solvent. More preferably, it is a mixture of water and a $C_{1-4}$-alkanol substituted with $C_{1-4}$-alkoxy, for example ethoxy propanol. Preferably, the weight ratio of water/organic solvent is in the range of from 0.5/1 to 1/0.5.

The protective coating composition can comprise from 1 to 99%, preferably from 20 to 99%, more preferably, from 40 to 99%; most preferably from 70 to 95% by weight of the binder based on the weight of the total composition.

The protective coating composition can comprise from 1 to 50%, preferably from 1 to 30%, more preferably, from 5 to 29% by weight of the solvent based on the weight of the total composition.

The protective coating composition can be applied to the substrate coated with the composition of the present invention using a standard coating application as listed above.

After being applied, the protective coating composition can be dried, for example at ambient or elevated temperature.

The thickness of the obtained protective coating layer is usually chosen to be in the range of 0.1 to 1000 µm. Preferably, it is in the range of 1 to 500 µm. More preferably, it is in the range of 1 to 200 µm. Most preferably, it is in the range of 1-20 µm.

Another part of the invention is a substrate having a laser-sensitive coating layer and, on top, a protective coating layer obtainable by above process.

Also part of the invention is a process for preparing a marked substrate, which comprises the steps of i) providing the above substrate having a laser-sensitive coating layer or the above substrate having a laser-sensitive coating layer and on top a protective coating layer, and ii) exposing those parts of the substrate of step i), where a marking is intended, to laser irradiation in order to generate a marking.

Usually, the coated side of the substrate of step i) is exposed to laser irradiation. However, if the substrate is transparent, also the uncoated side could be exposed to laser irradiation.

The laser irradiation can be ultraviolet, visible or infrared laser irradiation. Preferably, the laser irradiation is infrared laser irradiation.

The infrared laser irradiation can be produced by suitable lasers such as $CO_2$ lasers, Nd:YAG lasers and IR semicoductor lasers. Irradiation using an Nd:YAG laser at a wavelength of 1064 nm is particulary preferred.

Typically the exact power of the IR laser and the line speed is determined by the application and chosen to be sufficient to generate the marking.

Yet another aspect of the invention is the marked substrate, which is obtained by above process.

Also part of the invention is a process for preparing a marked substrate A, which comprises the steps of i) providing above substrate having a laser-sensitive coating layer or above substrate having a laser-sensitive coating layer and on top a protective coating layer, ii) placing the coated side of the substrate of step i) against substrate A and iii) exposing those parts of the uncoated side of the substrate of step i), where a marking of opposed substrate A is intended, to laser irradiation in order to generate a marking on substrate A.

Substrate A can be any of the substrates listed above. Preferably, it is cardboard.

In, this case, the substrate having the laser-sensitive coating layer is preferably transparent, more preferably it is a transparent polymer.

Also part of the invention is marked substrate A obtainable by above process.

The substrates having the laser-sensitive coating layer or the substrates having the laser-sensitive coating layer, and, on top, a protective-coating layer could additionally be coated with an adhesive coating layer in order to be used as a label. The adhesive coating layer is usually formed on the uncoated side of the substrate. However, if the substrate is transparent, the adhesive coating layer could also be formed on top of the laser-sensitive coating layer, respectively, on top, of the protective coating layer.

The composition of the present invention has the advantage that it yields stable markings of high precision and high contrast upon exposure to infrared laser irradiation.

EXAMPLES

Example 1

Preparation of a Composition Comprising Titanium Dioxide in the Anatase Form (White Gravure Ink)

A varnish is prepared by mixing together Vinnapas® C501 resin manufactured by Wacker Chemie AG, a solid copolymer of vinyl acetate and crotonic acid with an acid number of 7.5 mg KOH/g, a molecular weight of 170 000 g/mol and a Tg of ca. 43° C., (20 parts) and propyl acetate (80 parts). Tioxide® A-HR, a titanium dioxide in the anatase form having a crystal size of 0.15 μm sold by Huntsman, (45 parts) is then added to the pre-prepared varnish (55 parts) over 5 minutes to prepare a white gravure ink.

Example 2

White Gravure Ink on Tobacco Board

The ink of example 1 is applied to standard tobacco packaging board using a standard K2 bar and then dried. Imaging with an Nd: YAG laser at 1064 nm gives excellent quality marking.

Example 3

White Gravure Ink on Tobacco Board with a Protective Coating Layer (Protective Over Laquer)

The ink prepared in example 1 is applied to standard tobacco packaging board using a standard K2 bar and then dried. An over lacquer, which is prepared from Neorez R-1010, a urethane dispersion sold by DSM Neoresins, (90 parts), water (5 parts) and ethoxy propanol (5 parts), is then applied on the print using a standard K2 bar and then dried. Despite the protective topcoat, imaging with an Nd: YAG laser at 1064 nm still gives excellent quality dark markings on a white background.

Example 4

Virtual Label on Kraft Board with Protective Over Lacquer

The ink prepared in example 1 is applied to Kraft board using a standard K2 bar and then dried. The over lacquer described in Example 3 is then applied on the print using a standard K2 bar and then dried. Despite the protective topcoat, imaging with an Nd: YAG laser at 1064 nm still gives excellent quality dark markings on a white background.

Example 5

White Gravure Ink on Coated Paper with Protective Over Lacquer

The ink prepared in example 1 is applied to coated paper using a standard K2 bar and then dried. The over lacquer described in Example 3 is then applied on the print using a standard. K2 bar and then dried. Despite the protective topcoat, imaging with an Nd: YAG laser at 1064 nm still gives excellent quality dark markings on a white background.

Example 6

White Gravure Ink on Opaque orientated Polypropylene Film with Protective Over Lacquer The ink prepared in example 1 is applied to opaque orientated polypropylene film using a standard K2 bar and then dried. The over lacquer described in Example 3 is then applied on the print using a standard K2 bar and then dried. Despite the protective topcoat, imaging with an Nd: YAG laser at 1064 nm still gives excellent quality dark markings on a white background.

Example 7

Reverse Print Laser Transfer to Tobacco Board

The ink prepared in example 1 is applied to transparent orientated polypropylene film using a standard K2 bar and then dried. This laser transfer sheet is then placed against tobacco board with the coated side in contact with the tobacco board. Imaging with an Nd: YAG laser from the non coated side of the polypropylene not only marks the polypropylene but also the image is transferred to give high contrast markings on the tobacco board.

Comparative Example 1

Preparation of a Composition Comprising Titanium Dioxide in the Rutile Form (White Gravure Ink)

A varnish is prepared by mixing together Vinnapas® C501 resin (cf. Example 1) (20 parts) and propyl acetate (80 parts). Tioxide® R-XL, a titanium dioxide in the rutile form sold by Huntsman (45 parts) is then added to the pre-prepared varnish (55 parts) over 5 minutes to prepare a white gravure ink.

Comparative Example 2

White Gravure Ink of Comparative Example 1 on Tobacco Board

The ink of comparative example 1 is applied to standard tobacco packaging board using a standard K2 bar and then dried. Imaging with an Nd: YAG laser at 1064 nm gives a marking, that is weaker (of lower contrast) than the marking obtained in example 2.

Example 8

Preparation of Polymeric Particles Comprising Encapsulated Titanium Dioxide in the Anatase Form An aqueous phase is prepared by diluting 100 g of a 46% by weight polymer microemulsion containing 32% by weight 70/30 (w/w) styrene-methyl methacrylate copolymer having a molecular weight of 200'000 g/mol stabilized with a 14% by weight 65/35 (w/w) styrene-acrylic acid copolymer having a molecular weight of 6'000 g/mol, with 100 g of water followed by dispersing 50 g of Tioxide® A-HR, a titanium dioxide in the anatase form having a crystal size of 0.15 μm sold by Huntsman, and 5 g of zinc oxide, which functions as crosslinker, under a high speed mixer. Separately, an oil phase is prepared by mixing 30 g of a 20% by weight solution of 90/10 (w/w) stearyl methacrylate-methacrylic acid copolymer having a molecular weight of 40,000 g/mol, which functions as amphiphatic stabilizer, and 500 g Isopar G, an isoparaffin with a distillation range of 155 to 179° C. available from ExxonMobil. The above aqueous phase is added to the oil phase under a high shear homogeniser to form a water-in-oil emulsion having a mean aqueous droplet particle sizes of 10 to 20 µm. The emulsion formed is transferred to a 1-liter flask set up for distillation. The emulsion is subjected to vacuum distillation to remove water/Isopar G mixture. The vacuum distillation is continued to 100° C. until no further water is collected in the distillate. Next, the flask contents are cooled to 25° C. and the polymeric particles comprising encapsulated titanium dioxide in the anatase form are isolated by filtration and oven dried at 90° C. The final product are free flowing white-coloured polymeric particles having a mean particle size diameter of 14 µm.

Example 9

Preparation of a Composition Comprising Polymeric Particles Comprising encapsulated titanium dioxide in the anatase form (White Gravure Ink)

A varnish is prepared by mixing together Vinnapas® C501 resin (cf. Example 1) (20 parts) and propyl acetate (80 parts). The polymeric particles comprising encapsulated titanium dioxide in the anatase form of example 8 (90 parts) are then added to the pre-prepared varnish (55 parts) over 5 minutes to prepare a white gravure ink.

Example 10

White Gravure Ink on Tobacco Board

The ink of example 9 is applied to standard tobacco packaging board using a standard K2 bar and then dried. Imaging with an Nd: YAG laser at 1064 nm gives clearly readable markings.

Example 11

White Ink Comprising Titanium Dioxide and Tungsten Bronze

Description

Titanium dioxide based white ink that has excellent photosensitivity to laser imaging at 1064 nm.
Formulation of the Ink

| Components | % by weight |
|---|---|
| C501 Varnish | 54.9 |
| A-HR Anatase TiO2 | 45.0 |
| Tungsten bronze WOx-03F | 0.1 |

The C501 Varnish is described in Example 1.

If desired, once the above ink has been applied e.g. to board and dried, it may be covered by an over laquer as described in Example 3.

The above formulation may be further improved for press stability and printability, the additions to the formulation may include, solvent changes, plasticizer, wax, adhesion promoters, silica, anti foam, surfactants, surface modifiers, pH adjusters etc. . . .
Manufacture of Tungsten bronze WOx-03F Ammonium paratungstate powder $((NH_4)_{10}W_{12}H_2O_{42}\cdot 4H_2O$, Osram Sylvania) is entrained into an argon carrier gas by a vibratory-type powder feeder operating at 10 g/minute. The fluidized powder is fed into a plasma reactor with a Tekna PL-50 plasma torch operated at a power of 65 kW. The temperature range typically reached in the plasma hot zone of the reactor is between 5000-10,000 K. A mixture of 100 slpm argon and 2 slpm hydrogen [slpm=standard liters per minute; standard conditions for the calculation of slpm are defined as: Tn 0° C. (32° F.), Pn=1.01 bar (14.72 psi)] is used for the sheath gas. The reactant vapor is cooled by a quench gas and the resulting powder is collected in a bag filter. The resulting powder is analyzed by powder X-ray diffraction, electron microscopy, and UV-vis-NIR spectroscopy and found to be composed of 35.59% by weight of $WO_3H_{0.53}$ (a specific "hydrogen tungsten bronze"), 55.73% by weight of $WO_3$ and 8.69% by weight of W.
Laser Settings Rofin, Neodymium yttrium vanadate (Nd:YVO4) 1064 nm 10w 1500 mms 20 kHz fill 60, power varies from 10-25 A Laser settings can vary in speed, power and frequency depending on the design and quality required.

Example 12

White Ink Comprising Titanium Dioxide And Lanthanum Hexaboride

Formulation of the Ink

| Components | % | Supplier |
|---|---|---|
| C501 Varnish | 54.9 | |
| A-HR Anatase TiO2 | 45.0 | Huntsman Tioxide |
| Lanthanum hexaboride powder <10 micron (241857) | 0.1 | Sigma Aldrich |

The C501 Varnish is described in Example 1.

Example 13

Comparison of Relative Laser Performance

The ink described in Example 11 which contains as IR absorber 0.1% of a mixture consisting of $WO_3H_{0.53}$, $WO_3$ and W (hereinafter designated as ink Z), and an ink composed of 45.0% by weight of A-HR Anatase TiO2 (described in Example 1), 53.6% by weight of C501 Varnish (described in Example 1), and 1.4% (not 0.1% as described in Example 12) of lanthanum hexaboride (hereinafter designated as ink Y), respectively, are compared to the analogous ink not comprising said absorbers (hereinafter designated as ink X).

Each of said inks X, Y and Z is applied to white packaging board using a standard K2 bar and dried. In addition, the over laquer described in Example 3 may be applied, if desired, and dried. Then a 1 cm square area of each of the obtained packaging boards is lasered (fill 60, 1500 mms, 20 Khz). The optical density of the imaged areas are then measured along with the background whiteness. As can be seen from the table below, 1.4% of $LaB_6$ is required to get a decent increase in optical density but due to its colour, problems are seen in terms of background whiteness. On the contrary, better image density is observed with only 0.1% of the ink of Example 11 (ink Z), and also the CIE whiteness of the unimaged area remains high at 99.15.

| Ink | IR Absorber | Image Density | Background Whiteness (CIE) |
|---|---|---|---|
| X | none | 0.37 | 99.54 |
| Y | LaB$_6$ (1.4%) | 0.49 | 92.54 |
| Z | Tungsten bronze WOx-03F (0.1%) | 0.62 | 99.15 |

The invention claimed is:

1. A process for preparing a marked substrate, comprising the steps of
   i) applying to a substrate a composition comprising titanium dioxide in the anatase form, a polymeric binder and at least one of tungsten suboxide, tungsten bronze, or mixtures of tungsten trioxide, tungsten bronze and metallic tungsten, and
   ii) irradiating those parts of the substrate of step i), where a marking is intended, with infrared laser irradiation in order to generate a marking.

2. The process of claim 1, wherein the substrate is paper, cardboard or polymer.

3. The process of claim 1, wherein the composition further comprises an infrared absorber.

4. The process of claim 1, wherein the composition further comprises a tungsten oxide of the formula WO$_{3-x}$, wherein x is 0.1-1.

5. The process of claim 4, wherein the tungsten oxide is WO$_{2.7}$.

6. A process for preparing a marked substrate A, comprising the steps of
   i) obtaining a substrate A and a substrate B,
   ii) applying to substrate B a composition comprising titanium dioxide in the anatase form, a polymeric binder and at least one of tungsten suboxide, tungsten bronze, or mixtures of tungsten trioxide, tungsten bronze and metallic tungsten,
   iii) placing the coated side of substrate B of step ii) against substrate A, and
   iv) irradiating those parts of the uncoated side of substrate B of step ii), where a marking of opposed substrate A is intended, with infrared laser irradiation in order to generate a marking on substrate A.

7. The process of claim 6, wherein substrate B is paper, cardboard or polymer.

8. The process of claim 6, wherein the composition further comprises an infrared absorber.

9. The process of claim 6, wherein the composition further comprises a tungsten oxide of the formula WO$_{3-x}$, wherein x is 0.1-1.

10. The process of claim 9, wherein the tungsten oxide is WO$_{2.7}$.

* * * * *